US010053583B2

(12) United States Patent
Wolpers et al.

(10) Patent No.: US 10,053,583 B2
(45) Date of Patent: *Aug. 21, 2018

(54) METAL PRETREATMENT WITH ACIDIC AQUEOUS COMPOSITIONS COMPRISING SILANES

(71) Applicant: Henkel AG & Co. KGaA, Duesseldorf (DE)

(72) Inventors: Michael Wolpers, Erkrath (DE); Jurgen Stodt, Neuss (DE); Uta Sundermeier, Leichlingen (DE); Qi Zhang, Ann Arbor, MI (US); Junjun Wan, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 203 days.

This patent is subject to a terminal disclaimer.

(21) Appl. No.: 15/015,558

(22) Filed: Feb. 4, 2016

(65) Prior Publication Data
US 2016/0152838 A1 Jun. 2, 2016

Related U.S. Application Data
(63) Continuation of application No. PCT/EP2014/066935, filed on Aug. 6, 2014.

(30) Foreign Application Priority Data
Aug. 6, 2013 (DE) .................. 10 2013 215 440

(51) Int. Cl.
C09D 5/08 (2006.01)
C23C 22/34 (2006.01)
C23C 22/36 (2006.01)
C23C 22/48 (2006.01)
C23C 22/73 (2006.01)
B32B 15/04 (2006.01)
B32B 15/082 (2006.01)
B32B 15/095 (2006.01)

(52) U.S. Cl.
CPC ............. *C09D 5/088* (2013.01); *C09D 5/082* (2013.01); *C23C 22/34* (2013.01); *C23C 22/361* (2013.01); *C23C 22/48* (2013.01); *C23C 22/73* (2013.01); *B32B 15/04* (2013.01); *B32B 15/082* (2013.01); *B32B 15/095* (2013.01); *C23C 2222/20* (2013.01)

(58) Field of Classification Search
CPC ................. C09D 5/08; C09D 5/086
USPC ....... 106/14.05, 14.12, 14.15, 14.44, 287.11, 106/287.13, 287.16
See application file for complete search history.

(56) References Cited

U.S. PATENT DOCUMENTS

| 6,203,854 B1* | 3/2001 | Affinito | C23C 22/34 427/327 |
| 6,475,300 B2* | 11/2002 | Shimakura | C09D 4/00 106/14.41 |
| 6,733,579 B1* | 5/2004 | Gorecki | C09D 5/12 106/287.11 |
| 8,304,092 B2* | 11/2012 | Okai | C09D 5/082 106/14.05 |
| 2001/0042491 A1* | 11/2001 | Shimakura | C09D 4/00 106/14.44 |
| 2004/0139887 A1* | 7/2004 | Zhang | C09D 5/002 106/287.11 |
| 2008/0127859 A1 | 6/2008 | Kolberg et al. | |
| 2008/0138615 A1* | 6/2008 | Kolberg | C09D 5/08 428/341 |
| 2009/0078340 A1* | 3/2009 | Ando | C23C 22/34 148/283 |
| 2011/0008645 A1 | 1/2011 | Schneider et al. | |
| 2011/0076501 A1 | 3/2011 | Dewald et al. | |
| 2011/0100513 A1 | 5/2011 | Schlosser et al. | |
| 2011/0314137 A1* | 12/2011 | Vermoesen | H04L 41/028 709/221 |
| 2013/0177768 A1 | 7/2013 | Krueger et al. | |
| 2013/0302637 A1* | 11/2013 | Matsuda | C09D 5/08 428/623 |
| 2017/0314137 A1* | 11/2017 | Schneider | C23C 22/17 |

FOREIGN PATENT DOCUMENTS

| CA | 2833367 A1 | 11/2012 |
| EP | 1130131 A2 | 9/2001 |
| EP | 1433877 A1 | 6/2004 |
| EP | 2216371 A1 | 8/2010 |
| EP | 2284234 A1 | 2/2011 |
| JP | 56125464 A | 10/1981 |
| JP | 2006-213958 * | 8/2006 |

(Continued)

OTHER PUBLICATIONS

Machine translation of JP 2006-213958 (no date).*
International Search Report for International application PCT/EP2014/066938, dated Nov. 3, 2014. All references cited in the International Search Report are listed herein.
International Search Report for International application PCT/EP2014/066935, dated Nov. 3, 2014. All references cited in the International Search Report are listed herein.

(Continued)

Primary Examiner — Marc S Zimmer
(74) Attorney, Agent, or Firm — Mary K. Cameron

(57) ABSTRACT

The invention is directed to an acidic aqueous metal pretreatment solution that comprises amino-functional organosilanes, complex anions of the elements Zr, Ti, Hf and/or Si as well as oxyacids of phosphorus; a process for the treatment of metal substrates, especially selected from zinc and zinc-coated steel substrates, wherein metal pretreatment solutions of this invention are applied to reduce corrosion when applied to metal surfaces and in addition confer good adhesion properties for subsequently coated organic lacquers.

17 Claims, No Drawings

(56) References Cited

FOREIGN PATENT DOCUMENTS

| JP | 2006213958 A | | 8/2006 |
|---|---|---|---|
| JP | 2007177314 A | | 7/2007 |
| WO | 0046310 A1 | | 8/2000 |
| WO | 0107679 A1 | | 2/2001 |
| WO | WO 01/07679 | * | 2/2001 |
| WO | 2006076197 A1 | | 7/2006 |
| WO | 2010070728 A1 | | 6/2010 |
| WO | 2011056944 A1 | | 5/2011 |
| WO | 2012165084 A1 | | 12/2012 |

OTHER PUBLICATIONS

W. J. van Ooij et al.; "Corrosion Protection Properties of Organofunctional Silanes—An Overview", Tsinghua Science and Technology, vol. 10, No. (6), Dec. 2005, pp. 639-664.

* cited by examiner

METAL PRETREATMENT WITH ACIDIC AQUEOUS COMPOSITIONS COMPRISING SILANES

TECHNICAL FIELD

The invention relates to an acidic aqueous metal pretreatment solution that comprises amino-functional organosilanes, complex anions of the elements Zr, Ti, Hf and/or Si as well as oxyacids of phosphorus. These types of metal pretreatment solutions effectively reduce temporary corrosion when applied to metal surfaces and in addition confer good adhesion properties for subsequently coated organic lacquers. The invention consequently also encompasses a process for the treatment of metal substrates, especially selected from zinc and zinc-coated steel substrates, wherein metal pretreatment solutions of this invention are applied.

BACKGROUND OF THE INVENTION

Anticorrosion agents for metal surfaces that include an acidic aqueous solution of fluoro complexes have long been known. They are increasingly employed as a replacement for chromating processes which, due to the toxicological properties of chromium compounds, are less and less used. Generally, solutions of fluoro complexes of this type contain additional anticorrosion agents that further improve corrosion protection and paint adhesion. Nevertheless, different attempts have been made in the prior art to passivate metal surfaces and thereby to condition metal surfaces for the application of further coatings.

WO 00146310 for example discloses water based compositions suitable for the corrosion-resistant treatment of metal surfaces, wherein the compositions are composed of condensable amino-functional silanes and polysilanes. According to this teaching, these types of compositions are to be applied on the metal surface and dried thereupon.

JP 56125464 relates to the formation of wear-resistant coatings on metal surfaces based on curable compositions that are composed of organosilanes and silane-functional epoxy resins.

EP 2284234 A1 teaches a pretreatment for the temporary corrosion protection of metal coils based on condensed organosilanes that additionally improve the deep drawing properties of the as-treated coils. In this respect such metal treatment solutions are disclosed that contain a mixture of organosilanes that are at least partially comprised of amino-functional organosilanes, and diols of polyethers, polyesters and/or polycarbonates.

EP221637 discloses corrosion-resistant thin coatings based on aqueous compositions of silicates and hydrolyzable organosilanes, and which are suitable for high-temperature applications. These compositions have a low volatile organic content.

EP1433877 teaches aqueous compositions for the passivation of metal surfaces suitable for the application of an organic electrocoating. The compositions disclosed therein are mixtures of an amino-functional organosilane and water soluble compounds of the elements Zr, Ti and/or Hf, whilst an amount of dissolved fluorides is mandatory.

Despite these manifold compositions for the corrosion-resistant treatment of metals, which are already known in the prior art, there still exists a need to further improve the properties of the passivation layer conferred to the metal surface in the processes of the prior art. Especially, there is a need to establish stable water-based compositions based on organosilanes which are capable of efficiently passivating metal surfaces and which contain only small amounts of transition metal elements.

SUMMARY OF THE INVENTION

The problem of the underlying invention that is to be solved therefore consists in establishing an aqueous composition based on organosilanes suitable for forming a highly protective coating on bare metal surfaces. Such an aqueous composition of the invention shall when applied to a bare metal substrate provide a high corrosion resistance of the as coated metal substrate and shall additionally confer improved adhesion of further applied organic coatings. Furthermore, the aqueous composition has to comprise the organosilanes in an amount sufficient to yield a homogenous protective coating after drying of a wet film of the aqueous composition being applied by conventional means to the bare metal surface. Such an aqueous composition should be stable against gelification caused by condensation of the organosilanes, so that an adequate shelf lifetime of the aqueous composition is guaranteed. Moreover, such an aqueous composition shall comprise only minor amounts of transition metal elements.

DETAILED DESCRIPTION

It was surprisingly found that an acid aqueous solution of organosilanes having at least one non hydrolysable substituent carrying an amino functional group and complex anions of the elements Zr, Ti, Hf and/or Si can be stabilized against gelification in the presence of acids when the compounds are present in a given ratio range. These acidic aqueous solutions when applied to bare metal surfaces give rise to coatings that effectively protect the metal substrate from corrosion and may additionally provide excellent adhesion to further applied organic coatings.

Thus, the first aspect of the invention is an acidic aqueous solution suitable for the pretreatment of metals with a pH in the range from 2.0 to 5.5 comprising a) more than 0.2 wt.-% calculated with respect to the element Si of at least one organosilane with at least one hydrolyzable substituent and one to three non-hydrolyzable substituents, wherein at least one of the non-hydrolyzable substituents carries at least one amino group, and wherein the total number of substituents at each silicon atom of the organosilanes is four, b) at least one complex anion of the elements Zr, Ti, Hf and/or Si, and c) at least one oxyacid of phosphorus, wherein the molar ratio of the total amount of organosilanes calculated with respect to the element Si to the total amount of complex anions of the elements B, Zr, Ti, Hf and/or Si calculated with respect to the elements B, Zr, Ti, Hf and/or Si is in a range from 80 to 500.

An "organosilane" according to the invention provides a tetravalent silicon atom with four polar covalently bound substituents while at least one covalent Si—C bond is present. Such a covalent Si—C bond always carries a non-hydrolyzable substituent. Therefore, in this context a hydrolyzable substituent is by definition not to be bound via such a covalent Si—C bond to the silicon atom of the organosilane.

The skilled person knows that organosilanes when dissolved in water may undergo manifold hydrolysis and self-condensation reactions and are thus in equilibrium with the respective hydrolyzed and condensed species. The feature that the pretreatment composition shall comprise the organosilane as defined herein is therefore to be understood that a pretreatment solution is obtainable by adding the respective organosilane according to component a) to an aqueous solution that may or may not already comprise one or both of the other essential components b) and c).

Surprisingly, a relatively small amount of complex anions of the compounds of component b) compared to the overall amount of organosilanes present in an acidic aqueous solution of this invention is already sufficient to confer anticorrosive properties to bare metal surfaces that are highly superior to those conferred by analogous compositions that do not comprise compounds of component b).

The corrosion resistance becomes inferior by further increasing the relative amount of complex anions of the compounds of component b) beyond the prescribed value; in fact gelification of the acidic aqueous solutions can be observed if the molar ratio falls below the prescribed lower limit which may additionally give rise to the poorer performance with respect to the corrosion resistance. In a preferred embodiment the molar ratio of the total amount of organosilanes calculated with respect to the element Si to complex anions of the elements B, Zr, Ti, Hf and/or Si calculated with respect to the elements B, Zr, Ti, Hf and/or Si is at least 100, more preferably at least 120, but in order to ensure an optimum corrosion protection efficiency preferably not higher than 400, more preferably not higher than 300. For the same reasons given above the total amount of complex anions of the elements Zr, Ti, Hf and/or Si calculated with respect to the elements Zr, Ti, Hf and/or Si is preferably not more than 0.05 wt.-%.

It is further preferred that the acidic aqueous compositions of this invention comprise such complex anions according to component b) that are selected from oxyfluoroanions or fluoroanions of the elements B, Zr, Ti, Hf and/or Si, preferably from oxyfluoroanions or fluoroanions of the elements Zr and/or Ti, more preferably from oxyfluoroanions or fluoroanions of the element Ti. These fluoroanions can be provided by adding fluoroacids of these metals and/or water soluble salts of hexafluorometallates to an aqueous solution in order to establish a composition of this invention. Oxyfluoroanions can be provided by additionally mixing water soluble salts of the same metals, such as nitrates and/or carbonates, to an aqueous solution already comprising the fluoroanions according to component b).

An acidic aqueous solution according to this invention (hereinafter "metal pretreatment solution") may comprise other organosilanes than those that accord with component a). Nonetheless, it is preferred that the total amount of organosilanes calculated with respect to the element Si within the pretreatment solution does not exceed 10 wt.-% in order to prevent gelification and precipitation of the active ingredients. Moreover, the fraction of organosilanes according to compound a) based on the total amount of organosilanes each calculated with respect to the element Si is preferably at least 30 mol-%, more preferably at least 40 mol-% in order to achieve optimum corrosion protection when applied to a bare metal surface.

A metal pretreatment solution according to this invention preferably comprises such organosilanes according to component a) that are selected from compounds according to the following general structure (I):

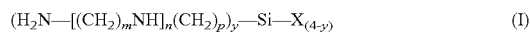

$$(H_2N-[(CH_2)_m NH]_n(CH_2)_p)_y-Si-X_{(4-y)} \quad (I)$$

wherein the hydrolyzable substituents X are independently from each other selected from alkoxy groups with not more than 4, preferably not more than 2 carbon atoms;
wherein m and p each independently from another are integer numbers in the range from 1 to 4;
wherein n is an integer number in the range from 0 to 8, preferably from 0 to 3; and
wherein y is an integer number in the range from 1 to 3, and preferably y equals to 1.

Accordingly composed pretreatment solutions were found to give rise to highly adherent coatings on bare metal surfaces, especially to steel and zinc-coated steel, and thus to coatings with a superior corrosion protection performance.

Especially preferred in this context are organosilanes according to component a) that are selected from monoaminoalkylalkoxysilanes, such as aminopropyltrimethoxysilane, aminopropyltriethoxysilane, aminoethyltrimethoxysilane, aminoethyltriethoxysilane, aminomethyltrimethoxysilane, aminomethyltriethoxysilane, aminopropylmethyldimethoxysilane and aminopropylmethyldiethoxysilane; diaminoalkylalkoxysilanes, such as aminoethylaminopropyltrimethoxysilane, aminoethylaminopropyltriethoxysilane; and, so-called triaminoalkylalkoxysilanes, such as aminoethylaminoethylaminopropyltrimethoxysilane or aminoethylaminoethylaminopropyltriethoxysilane.

In order to further improve the coating characteristics with respect to the adhesion to further applied organic lacquers a preferred metal pretreatment solution does additionally comprise organosilanes which are different from component a) and which are preferably selected from organosilanes with at least one hydrolyzable substituent and one to three non-hydrolyzable substituents, wherein at least one of the non-hydrolyzable substituents carries at least one hydroxyl or oxirane functional group. These types of organosilanes different from component a) are beneficial for further promoting the adhesion to organic lacquers based on epoxy resins, urethane resins or acrylic resins. Especially preferred in this context are organosilanes selected from (3-Glycidyloxypropyl)trimethoxysilane and/or (3-Glycidyloxypropyl)-triethoxysilane. The fraction of these type of organosilanes carrying at least one hydroxyl or oxirane functional group based on the total amount of organosilanes each calculated with respect to the element Si is preferably at least 10 mol-%, more preferably at least 20 mol-%.

In a preferred embodiment of the invention the metal pretreatment solution is characterized by a molar ratio of the amount of organosilanes calculated with respect to the element Si to oxyacids of phosphorus calculated with respect to the element P being with increasing preference at least 0.5, 0.8, 1 and 2, but preferably with increasing preference not more than 5, 4 and 3.

Preferred oxyacids of phosphorus according to component c) of the metal pretreatment solution are selected from organophosphorus acids, phosphorous acid and/or phosphoric acid, wherein the fraction of organophosphorus acids based on the total amount of oxyacids of phosphorus is preferably at least 10 mol-%, preferably at least 40 mol-%, even more preferably at least 80 mol-% calculated with respect to the element P. It was surprisingly found that the corrosion protective properties can be further improved when a coating based on metal pretreatment solutions comprising organophosphorus acids is formed on the bare metal surface. Consequently, an amount of less than 10 mol-% calculated with respect to the element P of organophosphorous acids based on the total amount of oxyacids of phosphorous may make it necessary to increase the amount of oxyacids of phosphorous relative to the amount of organosilanes in order to maintain optimum corrosion protective properties. Under such conditions it is preferred that the molar ratio of the amount of organosilanes calculated with respect to the element Si to oxyacids of phosphorus calculated with respect to the element P is not more than 3, preferably not more than 2, but preferably at least 0.5.

In this context, the metal pretreatment solution preferably contains organophosphorus acids with at least two functional phosphonic acid groups that are bridged via an alkylene, oxyalkylene or aminoalkylene group, wherein the alkylene, oxyalkylene or aminoalkylene bridge may be further substituted with amino, hydroxyl and/or aminoalkyl and/or hydroxyalkyl groups each with not more than 4 carbon atoms. The shortest alkylene bridge that connects two functional phosphonic groups is preferably constituted of not more than 4 carbon atoms. Representatives of these organophosphorous acids are for example etidronic acid or alendronic acid.

Those organophosphorus acids that are selected from α-aminophosphonic acids that accord with the following general formula (II) are especially preferred:

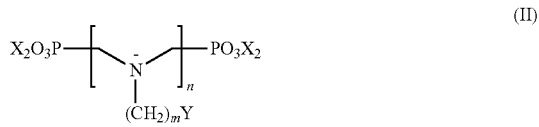

(II)

wherein n is an integer number of at least 1, but not more than 5, preferably not more than 3;
wherein m is an integer number of at least 1, but not more than 5;
wherein the substituent Y is selected from —P(=O)(OX)$_2$, —OH and —NH$_2$, preferably selected from —P(=O)(OX)$_2$ and —OH;
wherein the residues X are independently from each other selected from hydrogen, aliphatic groups with not more than 4 carbon atoms, alkali metal cations, ammonium or quaternary ammonium cations; and
wherein at least one residue X is selected from hydrogen.

In an even more preferred embodiment of this invention the organophosphorus acids according to component c) are selected from α-aminophosphonic acids that accord with the following general formula (III):

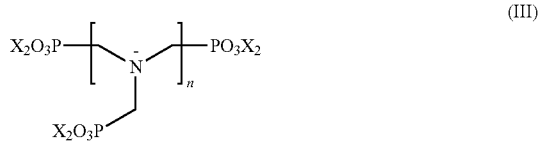

(III)

wherein n is an integer number of at least 1, but not more than 5, preferably not more than 3;
wherein the residues X are independently from each other selected from hydrogen, aliphatic groups with not more than 4 carbon atoms, alkali metal cations, ammonium or quaternary ammonium cations; and
wherein at least one residue X is selected from hydrogen.

Especially preferred α-aminophosphonic acids in a metal pretreatment solution of this invention are nitrilotris(methylenephosphonic acid), ethylenediaminetetrakis(methylenephosphonic acid) and/or diethylenetriaminepentakis(methylenephosphonic acid) and their alkali metal, ammonium or quaternary ammonium salts.

The beneficial corrosion protective properties of coatings provided with a metal pretreatment solution of this invention that comprises organosilanes with hydrolyzable substituents were found to require the presence of the oxyacids of phosphorus. It is therefore advantageous if the acidity of the metal pretreatment solution is essentially provided by the oxyacids of phosphorus. Accordingly, the amount of acids with a pK$_A$ value for the first deprotonation step of above 3.5 is in a preferred metal pretreatment solution below 0.05 wt.-%, more preferably below 0.01 wt.-%. In an even more preferred embodiment the metal pretreatment solution comprises less than 0.05 wt.-%, especially less than 0.01 wt.-% of other acids than oxyacids of phosphorus according to component c). The metal pretreatment solution of this invention preferably has a pH in the range from 2.5 to 4.5, preferably in the range from 2.5 to 4.0.

The performance of the metal pretreatment solutions of this invention does not depend on the presence of chromium cations that are known in the prior art to effectively furnish bare metal surfaces with a passivating layer. Therefore, it is for economic and environmental reasons preferred that the metal pretreatment solutions of this invention comprise less than 100 ppm, more preferably less than 10 ppm of chromium.

A metal pretreatment solution of this invention is preferably obtainable through a process where at least one organosilane according to component a) is added stepwise to an aqueous solution comprising at least one complex anion of the elements B, Zr, Ti, Hf and/or Si and at least one oxyacid of phosphorus according to component c), while upon addition of the organosilanes according to component a) the temperature of the resulting aqueous solution is kept in a range of from 10 C to 60° C.

A preferred pretreatment solution can be obtained through evaporation of the alcohols being released upon addition of the organosilanes according to component a) to the aqueous solution under reduced pressure and/or elevated temperature, preferably until the content of alcohols in the aqueous solution is below 0.1 wt.-%.

A metal pretreatment solution of this invention is capable of providing superior corrosion resistance towards bare metal surfaces. Therefore, the solutions of this invention are suitable for the temporary corrosion protection of metal surfaces. For this purpose metal pretreatment solutions are preferred that comprise less than 0.1 wt.-%, more preferably less than 0.01 wt.-%, even more preferably less than 0.001 wt.-% of organic polymers. The term "organic polymer" in the context of this invention is meant to encompass compounds with a carbon content of at least 60 wt.-% and a weight-average molecular weight of more than 400 g/mol as determined with gel permeation chromatography (GPC).

On the other hand, the presence of organic polymer is not per se detrimental to the corrosion resistance performance. In case that the bare metal surface is to be coated with a permanent corrosion resistant layer that additionally promotes the adhesion to further applied organic lacquers, it is preferred that the metal pretreatment solution additionally comprises at least 0.001 wt.-%, more preferably at least 0.01 wt.-%, and even more preferred at least 0.1 wt.-% of organic polymers. The organic polymers being additionally present in a metal pretreatment solution of this invention are preferably selected from acrylic, epoxy and/or urethane polymers, more preferably from acrylic and/or urethane polymers. In this context it is preferred that the mass fraction of organic polymers in the metal pretreatment composition with respect to the overall amount of organosilanes preferably does not exceed the ratio 3:1 and even more preferably lies within the range of from 1:2 to 2:1.

In order to attain optimum adhesion of a subsequent organic coating to the pretreated metal surface the metal pretreatment solution of this invention preferably comprises silane-functional acrylic, epoxy and/or urethane polymers, more preferably silane-functional urethane polymers. Preferably such silane-functional urethane polymers are a reaction product of a diisocyanate, a polyol and an amino-functional organosilane according to component a) of the pretreatment composition of this invention.

A preferred pretreatment composition of this invention that comprises a silane-functional urethane polymer is obtainable through a process wherein a) an amount of a diisocyanate is added stepwise to an amount of a polyol being dissolved in an aprotic water-miscible solvent acting as a reaction medium while stirring the reaction medium at a temperature in the range of from 30 to 90° C. for at least 10 minutes and wherein an amount of an organosilane with at least one hydrolyzable substituent and one to three non-hydrolyzable substituents, wherein at least one of the non-hydrolyzable substituents carries at least one amino group, and wherein the total number of substituents at each silicon atom of the organosilanes is four, is either co-present in the reaction medium or added to the reaction medium after at least 50 wt.-% of the amount of the diisocyanate has been added stepwise to the reaction medium while the temperature is kept in the range of from 30 to 90° C., b) a portion of the reaction medium comprising the silane-functional urethane polymer is subsequently combined under stirring with a portion of an acidic aqueous solution being greater by volume than the portion of the reaction medium and c) the acidic aqueous solution comprises more than 0.2 wt.-% calculated with respect to the element Si of at least one organosilane with at least one hydrolyzable substituent and one to three non-hydrolyzable substituents, wherein at least one of the non-hydrolyzable substituents carries at least one amino group, and wherein the total number of substituents at each silicon atom of the organosilanes is four, at least one complex anion of the elements B, Zr, Ti, Hf and/or Si, and at least one oxyacid of phosphorus, d) the molar ratio of the total amount of organosilanes calculated with respect to the element Si to the total amount of complex anions of the elements B, Zr, Ti, Hf and/or Si calculated with respect to the elements B, Zr, Ti, Hf and/or Si is in a range from 80 to 500.

An "aprotic water-miscible solvent" according to this invention does not comprise hydrogen atoms being bound to either nitrogen, oxygen or sulphur, while at least 50 grams of the solvent are miscible in 1000 grams of water at 20° C. A preferred aprotic water-miscible solvent is N-methyl-pyrrolidone.

In a preferred embodiment, the pretreatment composition of this invention that comprises a silane-functional urethane polymer is obtainable in a process as described above wherein the said organosilane is co-present with the polyol in the reaction medium and the diisocyanate is added stepwise to the reaction medium comprising the organosilane and the polyol.

In a further preferred embodiment, the pretreatment composition of this invention that comprises a silane-functional urethane polymer is obtainable in a process as described above, wherein the molar ratio of the diisocyanates to the polyols within the reaction mixture is from 2:3 to 3:2 and wherein the molar ratio of organosilanes to the polyols within the reaction mixture is from 1:3 to 2:3.

Where a pretreatment composition of this invention is obtained through a process as defined above, the polyol being dissolved in the reaction medium is preferably selected from alkanediols with not more than 8, more preferably not more than 6 carbon atoms and/or from polyalkylene glycols with not more than 5 oxyalkylene groups, wherein the alkylene is preferably selected from butylene, propylene and/or ethylene.

Where a pretreatment composition of this invention is obtained through a process as defined above the diisocyanate being added stepwise to the reaction medium is preferably selected from aliphatic diisocyanates with not more than 8, more preferably not more than 6 carbon atoms.

Where a pretreatment composition of this invention is obtained through a process as defined above the organosilane being either co-present in the reaction medium or being at least partially added to the reaction medium after the diisocyanate has been added stepwise is preferably selected from those organosilanes that accord with preferred organosilanes being described herein in detail with regard to component a) of the metal pretreatment solution.

The invention further encompasses a process for the corrosion-resistant treatment of metals wherein a metal substrate is brought into contact with a metal pretreatment solution according to this invention. For this second aspect of the underlying invention, the means for bringing the metal pretreatment solution into contact with the metal substrate are not critical and may be selected from immersion, spraying, roller-coating and squeegee-coating techniques.

Where the pretreatment process is conducted to provide metal surfaces with a temporary corrosion protection, it is preferred that the metal pretreatment solution comprises less than 0.1 wt.-% of organic polymers. In this context it is further preferred that contacting the metal substrate with a metal pretreatment solution of this invention gives rise to a wet film thickness that after drying yields an elemental loading with respect to the element Si in a range of 5 to 150 mg/m$^2$, preferably in a range of 40 to 100 mg/m$^2$. The elemental loading can be determined based on X-ray fluorescence spectroscopy (XRF).

On the other hand, if the pretreatment process is conducted to provide metal surfaces with a corrosion protective coating that is to be further coated with an organic lacquer the metal pretreatment solution preferably comprises at least 0.1 wt.-% of an organic polymer, said polymer being preferably selected from those organic polymers as specified above. In this context it is further preferred that contacting the metal substrate with a metal pretreatment solution of this invention gives rise to a wet film thickness that after drying yields a dry coating thickness in a range of from 0.3 to 3 μm, preferably in a range of from 0.5 to 2 μm.

A preferred process for the corrosion-resistant treatment of metals is characterized in that a metal substrate is first brought into contact with a metal pretreatment solution according to this invention, wherein the metal pretreatment composition further comprises at least 0.1 wt.-% of an organic polymer being selected from urethane and/or acrylic polymers and secondly with or without intermediate rinsing and drying step further coated with an organic lacquer, preferably selected from powder lacquers or dipping paints.

In a preferred embodiment of this process wet film after contacting the metal substrate with the metal pretreatment composition comprising the organic polymers is dried while such a wet film thickness of the metal pretreatment solution is applied that upon drying a dry coating thickness in the range of from 0.3 to 3 μm is obtained. In an even more preferred embodiment of such a process of this invention, the organic lacquer is applied in such a way that an overall coating thickness in the range of from 10 to 100 μm is obtained.

The metal substrate to be brought into contact with a pretreatment solution of this invention is preferably selected from aluminum, zinc, iron and their alloys, as well as from steel and zinc coated steel; zinc and zinc-coated steel surfaces are especially preferred.

The type of metal substrate in the context of this invention is not limited although flats like metal coils or metal sheets are preferred as they can be easily coated with a homogeneous wet film of a metal pretreatment solution of this invention that, according to a preferred process of this invention, is to be dried to yield a thin corrosion protective coating on the bare metal surface.

EXAMPLES

Acidic aqueous metal pretreatment solutions (PTS) are prepared following the general routine of adding a mixture of organosilanes (MOS) dropwise to an acidic aqueous solution (AAS) under stirring whilst the temperature is kept at 42° C. After addition of the organosilanes (MOS) to the acidic aqueous solution (AAS) the resulting reaction mixture is stirred for 15 minutes at 50° C. A portion of water is then added to this reaction mixture and the amount of alcohols being released upon the condensation and hydrolyzation of the organosilanes is reduced to less than 0.1 wt.-% under reduced pressure to yield a concentrate of the respective acidic aqueous metal pretreatment solution. Table 1 depicts the specific composition of concentrates of metal pretreatment solutions (PTS) being prepared according to the aforementioned general routine.

TABLE 1

Composition[1] of concentrates of acidic metal pretreatment solutions

| | MOS | | | AAS | | | Ratio |
|---|---|---|---|---|---|---|---|
| No. | AMEO | GLYMO | PTMO | $H_3PO_4$ | $H_2TiF_6$ | $H_2O$ | Si/Ti |
| 1 | 17.6 | 18.9 | 13.2 | 11.3 | — | 112.2 | ∞ |
| 2 | 20.0 | 20.0 | 12.0 | 9.0 | 2.0 | 111.0 | 21 |
| 3 | 20.0 | 20.0 | 12.0 | 10.8 | 0.2 | 111.0 | 205 |
| 4 | 20.0 | 20.0 | 12.0 | 21.6 | 0.2 | 111.0 | 205 |
| 5 | 20.0 | — | 12.0 | 10.8 | 0.2 | 111.0 | 135 |

AMEO: 3-aminopropyltriethoxysilane
GLYMO: glycidoxypropyltrimethoxysilane
PTMO: trimethoxypropylsilane
$H_3PO_4$: 85 wt.-% phosphoric acid
$H_2TiF_6$: 60 wt.-% hexafluorotitanic acid
Si/Ti: molar ratio of the elements Si to Ti
$H_2O$: deionised water with $\kappa < 1$ μScm$^{-1}$
[1]all values given in grams Concentrate No. 2 showed gelification during the stirring of the reaction mixture and was thus not further investigated. Obviously, relatively high amounts of hexafluorzirconic acid are detrimental to the stability of metal pretreatment solutions based on organosilanes. In order to attain the metal pretreatment solutions from the concentrates (No. 1, 3-5), 150 grams of the respective concentrate was diluted with 350 grams of deionised water ($\kappa<1$ μScm$^{-1}$). The metal pretreatment solutions arising from the concentrates No. 1, 3-5 were then applied with a roller coater to zinc coated steel plates (HDG) in a wet film thickness so that a theoretical elemental loading of 60 mg/m$^2$ of Si was provided. The as-treated zinc coated steel plates were thereafter dried in an oven at 50° C. for 10 seconds. The corrosion resistant properties of the zinc coated steel plates being coated as described herein was determined based on the white rust appearance after exposure to Salt-Spray-Test (SST), Condensation-Climate-Test (CCT) and Condensate-Stack-Corrosion-Test. These results are summarized in Table 2.

TABLE 2

White rust on zinc coated steel plates treated with working solutions of Table 1

| | SST[1] | | CCT[2] | | Stack-Test[3] | |
|---|---|---|---|---|---|---|
| No. | WR/% | Time/h | WR/% | Time/h | WR/% | Time/h |
| 1 | 3 | 96 | 3 | 21 | 0 | 10 |
| 3 | 0 | 96 | 0 | 21 | 0 | 10 |
| 4 | 0 | 120 | 0 | 21 | 0 | 10 |
| 5 | 0 | 96 | 0 | 21 | 0 | 10 |

[1]exposed according to DIN-EN ISO 9227
[2]exposed according to DIN-EN ISO 6270-2 AT
[3]stack of 9 steel plates exposed according to DIN-EN ISO 6270-2 AT; assessment of the 5$^{th}$ steel plate
WR: area percentage of white rust appearance
PTS No. 2 not stable; gelification It is clear from Table 2 that the metal pretreatment solutions of this invention that comprise hexafluorotitanic acid (No. 3-5) in a relatively small amount compared to the overall amount of the organosilanes give the best protection against white rust formation. The metal pretreatment solution that, in addition to the organosilanes, does only comprise phosphoric acid (No. 1) is clearly inferior with respect to its capability to confer sufficient corrosion protection to zinc coated steel.

Another metal pretreatment solution according to this invention (No. 6) was prepared by adding 116 grams of an aqueous resinous dispersion comprising 40 wt.-% of a butylmethacrylate-methylmethacrylate copolymer to 174 grams of the concentrate No. 3 of Table 1. The mixture was diluted by a factor of two with deionised water ($\kappa<1$ μScm$^{-1}$) to result in a metal pretreatment composition of this invention (No. 6) that additionally comprises an organic resin. Again this metal pretreatment solution was applied with a roller coater to zinc coated steel plates (HDG) in a wet film thickness so that a theoretical elemental loading of 60 mg/m$^2$ of Si was provided. The wet film was dried in an oven at 50° C. for 10 seconds. After this pretreatment the zinc coated steel was further coated with a powder lacquer (Tiger, Drylac® 29/40010) so that, after another drying step at 200° C. for 7 minutes, a final coating thickness of 80 μm was attained. The as-coated metal substrate was exposed for 3 days to a Constant-Clima-Test according to DIN EN ISO 6270-2 CH and the adhesion of the lacquer was determined according to DIN EN ISO 2409 with an adhesive tape after a cross-hatch with a 6 mm Erichsen cupping was applied. Upon testing no failure of the adhesion was observed (GT value "0"). For comparison, the same testing was applied to a zinc coated steel plate which had been pretreated with the metal pretreatment solution derived from concentrate No. 1 after application of the same powder paint system. In this case, a significant adhesion loss was observed and a GT value of "4" obtained. A GT value of "5" indicates a complete loss of adhesion.

What is claimed is:

1. An acidic aqueous metal pretreatment solution comprising:
   a) at least one organosilane with at least one hydrolyzable substituent and one to three non-hydrolyzable substituents, present in an amount of more than 0.2 wt.-% calculated with respect to the element Si, wherein at least one of the non-hydrolyzable substituents carries at least one amino group, and wherein each silicon atom of the at least one organosilane has a total number of substituents that is four;
   b) at least one complex anion of an element selected from B, Zr, Ti, Hf and/or Si; and
   c) at least one oxyacid of phosphorus;
   wherein the metal pretreatment solution has a pH in a range from 2.0 to 5.5 and a molar ratio of a total amount of organosilanes, calculated with respect to the element Si, to a total amount of complex anions of the elements B, Zr, Ti, Hf and/or Si, calculated with respect to the elements B, Zr, Ti, Hf and/or Si, in a range from 80 to 500.

2. The metal pretreatment solution according to claim 1, wherein the total amount of organosilanes is not more than 10 wt.-% and wherein the fraction of organosilanes according to compound a) calculated, with respect to the element Si, based on the total amount of organosilanes, calculated with respect to the element Si, is at least 30 mol-%.

3. The metal pretreatment solution according to claim 1, wherein the total amount of complex anions of the elements Zr, Ti, Hf and/or Si calculated with respect to the elements Zr, Ti, Hf and/or Si is not more than 0.05 wt.-%.

4. The metal pretreatment solution according to claim 1, wherein the molar ratio of the total amount of organosilanes, calculated with respect to the element Si, to the total amount of complex anions of the elements B, Zr, Ti, Hf and/or Si, calculated with respect to the elements B, Zr, Ti, Hf and/or Si, is at least 100 but not more than 400.

5. The metal pretreatment solution according to claim 1, wherein the at least one organosilane according to component a) is selected from compounds according to general formula (I):

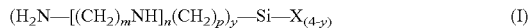

$$(H_2N-[(CH_2)_mNH]_n(CH_2)_p)_y-Si-X_{(4-y)} \quad (I)$$

wherein
X is each independently from each other a hydrolyzable substituent selected from alkoxy groups with not more than 4 carbon atoms;
m and p each independently from another are integer numbers in a range from 1 to 4;
n is an integer number in a range from 0 to 8; and
y is an integer number in a range from 1 to 3.

6. The metal pretreatment solution according to claim 1, additionally comprising organosilanes, different from component a), selected from organosilanes with at least one hydrolyzable substituent and one to three non-hydrolyzable substituents, wherein at least one of the non-hydrolyzable substituents carries at least one hydroxyl or oxirane functional group.

7. The metal pretreatment solution according to claim 6, wherein the fraction of organosilanes with at least one hydrolyzable substituent and one to three non-hydrolyzable substituents, wherein at least one of the non-hydrolyzable substituents carries at least one hydroxyl or oxirane functional group, calculated with respect to the element Si, based on the total amount of organosilanes calculated with respect to the element Si, is at least 10 mol-%.

8. The metal pretreatment solution according to claim 1, wherein the at least one complex anion according to component b) is selected from oxyfluoroanions or fluoroanions of the elements B, Zr, Ti, Hf and/or Si.

9. The metal pretreatment solution according to claim 1, wherein the oxyacid of phosphorus according to component c) is selected from organophosphorus acids, phosphorous acid, phosphoric acid and combinations thereof, wherein the organophosphorus acids are present in an amount of at least 10 mol-%, calculated with respect to the element P, of a total amount of oxyacids of phosphorus.

10. The metal pretreatment solution according to claim 9, wherein the organophosphorus acids are selected from α-aminophosphonic acids according to general formula (II):

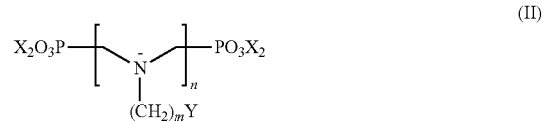

(II)

wherein n is an integer number of at least 1, but not more than 5;
m is an integer number of at least 1, but not more than 5;
substituent Y is selected from —P(=O)(OX)$_2$, —OH or —NH$_2$;
residues X are independently from each other selected from hydrogen,
aliphatic groups with not more than 4 carbon atoms, alkali metal cations,
ammonium cations or quaternary ammonium cations; and
wherein at least one residue X is a hydrogen.

11. The metal pretreatment solution according to claim 1, wherein the molar ratio of the total amount of organosilanes, calculated with respect to the element Si, to oxyacids of phosphorus, calculated with respect to the element P, is at least 0.5 but not more than 5.

12. The metal pretreatment solution according to claim 1, wherein amounts of acids with a pK$_A$ value of greater than 3.5 for the first deprotonation step present in the metal pretreatment solution is less than 0.05 wt.-%.

13. The metal pretreatment solution according to claim 1, wherein the pH of the aqueous acidic composition is in a range from 2.5 to 4.5.

14. The metal pretreatment solution according to claim 1, additionally comprising at least one organic polymer.

15. The metal pretreatment solution according to claim 14, wherein the at least one organic polymer is selected from acrylic polymers, urethane polymers and combinations thereof.

16. A process for improving corrosion-resistance of metal substrates comprising contacting a metal substrate with a metal pretreatment solution according to claim 1 to thereby produce a coated metal substrate.

17. A coated metal substrate produced according to the process of claim 16.

* * * * *